US008792470B2

(12) United States Patent
Rittner et al.

(10) Patent No.: US 8,792,470 B2
(45) Date of Patent: Jul. 29, 2014

(54) WIRELESS NETWORK FOR AIRCRAFT CABIN

(75) Inventors: Wolfgang Rittner, Ahrensbok (DE);
Rudiger Meckes, Berkenthin (DE);
Peter Glosekotter, Steinfurt (DE);
Gunter Boomgaarden, Scharbeutz (DE)

(73) Assignee: Zodiac Aerotechnics, Plaisir (FR)

( * ) Notice: Subject to any disclaimer, the term of this patent is extended or adjusted under 35 U.S.C. 154(b) by 26 days.

(21) Appl. No.: 13/401,883

(22) Filed: Feb. 22, 2012

(65) Prior Publication Data

US 2013/0215879 A1    Aug. 22, 2013

(51) Int. Cl.
*H04W 56/00*    (2009.01)

(52) U.S. Cl.
USPC .......... 370/347; 370/321; 370/337; 370/442; 370/448

(58) Field of Classification Search
USPC ......................................... 370/347
See application file for complete search history.

(56) References Cited

U.S. PATENT DOCUMENTS

| 8,467,327 | B2 * | 6/2013 | Hong et al. | 370/311 |
| 2004/0219938 | A1 * | 11/2004 | Parantainen et al. | 455/502 |
| 2009/0316679 | A1 * | 12/2009 | Van Der Wateren | 370/347 |
| 2011/0299487 | A1 * | 12/2011 | Ito et al. | 370/329 |
| 2012/0033684 | A1 * | 2/2012 | Mosko | 370/503 |
| 2012/0069835 | A1 * | 3/2012 | Nakamura | 370/347 |
| 2013/0155976 | A1 * | 6/2013 | Chen et al. | 370/329 |

FOREIGN PATENT DOCUMENTS

EP    2168635 A1    3/2010

OTHER PUBLICATIONS

Concepcion Tores, Journal of Systems Architecture, May 18, 2011.*
Torres, et al., "Reliable and energy optimized WSN design for a train application," *Journal of Systems Architecture*, 57(10):896-904 (2011).
Torres, et al., "Reliable and Energy Optimized Routing Algorithm for WSNs," Jun. 15-16, 2010 Retrieved from the Internet on Aug. 9, 2012: http://ieeexplore.ieee.org/stamp/stamp.jsp?tp=&arnumber=5759265>.
Search Report dated Aug. 12, 2012 in related European Patent Application No. 12156450.4.

* cited by examiner

*Primary Examiner* — Ian N Moore
*Assistant Examiner* — Lakeram Jangbahadur
(74) *Attorney, Agent, or Firm* — Kilpatrick Townsend & Stockton LLP; Dean W. Russell, Esq.

(57) ABSTRACT

The invention relates to a method for activating and maintaining a plurality of separate and distanced functional units in an aircraft cabin. According to the invention, a wireless network comprising a plurality of nodes is initialized, wherein each node is associated with a device wherein said initializing comprises associating each node a sending time slot within a time frame using a TDMA synchronization scheme, wherein each node is active to send signals during its sending time slot and is active to receive signals during a first set of time slots comprising a number of time slots of said frame, wherein the sending time slot of a node is different from the sending time slots of at least a plurality of its neighbored nodes.

15 Claims, 3 Drawing Sheets

Figure 4:
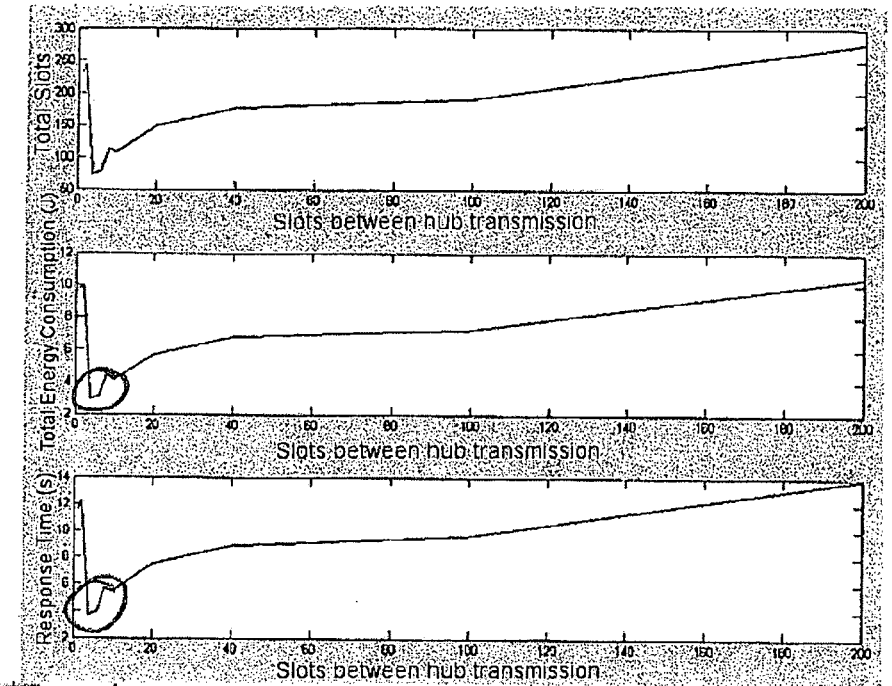

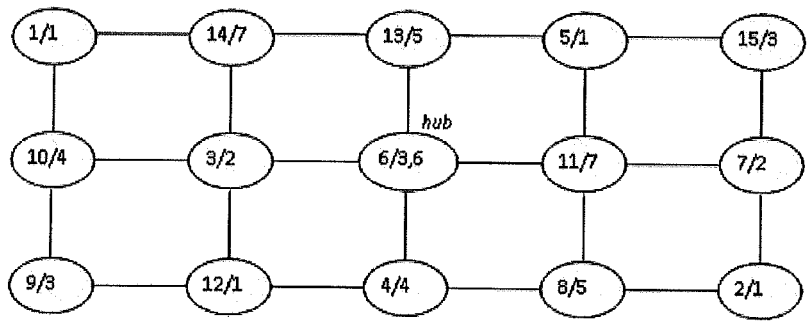
Fig. 1
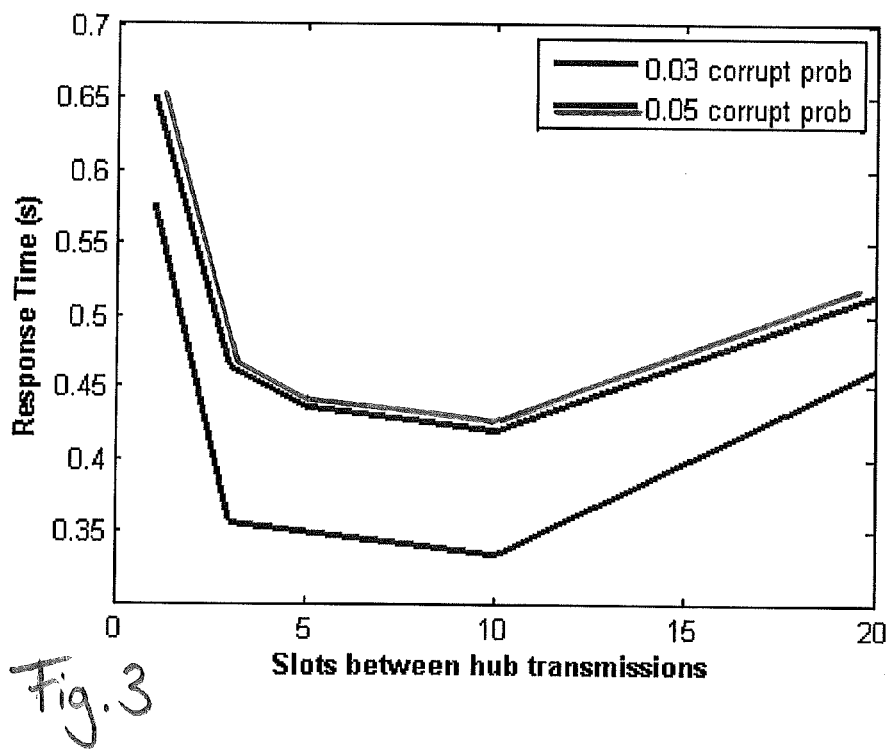
Fig. 2
Fig. 3

WIRELESS NETWORK FOR AIRCRAFT CABIN

The invention relates to a method for activating and maintaining a plurality of separate and distanced functional units in an aircraft cabin, in particular an aircraft. A separate and distanced functional unit may in particular be a remotely operable device used inside an aircraft cabin.

A further aspect of the invention is a cabin information system, in particular an emergency oxygen supply system for passenger of an aircraft.

Methods and systems for transmitting information within an aircraft are generally known in the prior art. It is an established technique in such systems to provide such information transmission via a plurality of signal lines connecting sender and receivers or—more generally—transmitter units adapted for sending an receiving data within said cabin. Whereas signal transmission via such signal lines is known to be safe and fast a general problem associated with such methods and systems is a significant effort for installing and maintaining such systems and a significant effort in case that such systems shall be extended to incorporate additional transmission units. Further, a general draw back of such systems is the weight associated with such signal lines which may represent a significant amount of the overall weight of the cabin information system as a whole in large civil aircraft.

In this description and the appending claims the term "functional unit" shall be understood generally as a device installed within an aircraft cabin or a cockpit of such aircraft which serves for operation of the aircraft in regular use or in an emergency situation. Such functional units may serve to provide information or entertainment to the passenger or may serve to supply oxygen to a passenger in an emergency situation and in these cases may be installed separately for one, two, three or more neighbored passengers typically. Moreover, such functional units maybe understood as general informational devices used by a crew member of such an aircraft or used to operate or control any independent devices like actuators within such aircraft.

In order to overcome at least some of the aforementioned drawbacks it has been proposed in EP 2168635A1 to replace at least partially the signal lines with a wireless transmission via a local area network within an aircraft cabin. Generally, such wireless transmission in a network has the potential to significantly reduce the weight of such information transmission system. However, significant problems occur in such systems and have resulted in manufacturers of aircraft to be reluctant in introducing such wireless systems. First, the installation of such a system may be time consuming in case that a large number of functional units must be connected to a transmission unit. Further, the transmission time via such wireless network may be significantly longer than via transmission by wire in conventional systems and thus may not fulfill the requirements of emergency systems in an aircraft. Finally, the energy consumption by such wireless transmission systems may be significantly higher than in transmission by wire and thus may reduce the economical efficiency of these systems and in particular may not fulfill the requirements to be fulfilled in emergency situation wherein the energy supply of the aircraft is not working.

It is an object of the invention to overcome these drawbacks in order to provide a method and a system for transmitting information within an aircraft which is well suited for quick and economic information transmission and fulfills the requirements of modern aircraft.

According to the invention, these problems are overcome by providing a method for activating and maintaining a plurality of separate and distanced functional units in an aircraft cabin, in particular an emergency oxygen supply system for passenger of an aircraft, comprising the steps of initializing a wireless network comprising a plurality of nodes, wherein each node is associated with a device, in particular a remotely operable device, wherein said initializing comprises associating each node a sending time slot within a time frame using a TDMA synchronization scheme, wherein each node is active to send signals during its sending time slot and is active to receive signals during a first set of time slots comprising a number of time slots of said frame, wherein the sending time slot of a node is different from the sending time slots of at least a plurality of its neighbored nodes, preferably all neighbored nodes, wherein a neighbored node of a node is defined to be within a predetermined distance to said node, sending an activation signal from one of the nodes to at least the plurality of nodes in a predetermined neighborhood distance to said node, wherein each node after having received said activation signal transmits said activation signal during the sending time slot associated to said node to at least one neighbored node.

According to this method a specific process of activating and maintaining a plurality of units in an aircraft is provided, wherein each unit is preferably associated to one node and said nodes are communicating with each other in a specific set-up. According to this set-up, the nodes need not to be active for communication all time, but instead the broadcasting time of the nodes are reduced to specific sending time slots and corresponding receiving time slots. By this, the energy consumption within the network can be significantly reduced and in particular the energy consumption of each single node can be significantly reduced. This allows the method to provide improved safety in case of failure of an energy supply unit within an aircraft and extends significantly the time period for which the method can be conducted using emergency energy supply systems of the aircraft. Furthermore, general efficiency of the aircraft is increased by this energy consumption reduction according to the method of the invention.

Still further, the method is characterized by a specific set-up of the communication between the nodes. This specific communication protocol is characterized by each node sending an activation signal to a plurality of nodes in a predetermined neighborhood distance to said node. By this, at first it is not required that each node is active to communicate with a centralized master node and thus the transmission power and the range of sending and receiving signals can be significantly reduced. Still further, by this specific communication protocol a certain spreading out and diversification of the activation signal is achieved resulting in an improved redundancy of the signal transmission. By this, the safety of the signal transmission is significantly improved by at the same time reduced energy consumption because it is neither required to provide more additional master nodes for the case of failure of a single master node responsible for sending out the activation signals to the other nodes. Furthermore, a plurality of signal paths is provided for signal transmission from one node to another node and failure of one single node will never result in an interruption of the signal transmission.

The method according to the invention is thus based on a specific type of flooding providing very high reliability and outstanding simplicity. No specific topology and maintenance is required since the method is based on a simple forwarding rule from one node to its neighbored nodes.

According to a first preferred embodiment the method comprises the steps of sequentially transmitting a synchronization packet by each node of the plurality of nodes during the number of s sending time slot(s) associated to the node, wherein the frame consists of m time slots and each node is active to listen during a multiple number of n receiving time slots of said frame to receive data, e.g. said synchronization packets, from the nodes in a predetermined neighborhood distance and is inactive during the remaining m-n-s number of sleeping time slots of said frame, wherein n<m, and wherein said n time slots preferably are different for at least two nodes, preferably for any two nodes of said plurality of nodes. According to this preferred embodiment the synchronization of the nodes is conducted in a very efficient way with regard to energy consumption and transfer speed. As a first measure, the nodes are not active to listen to the other nodes during all time slots within a frame but only during a selective number of time slots. Still further, the number of said selective time slots is adapted to the particular network configuration and/or the position of the node or other relevant parameters like the number of nodes in direct neighborhood to the particular node or the like. Generally, the number of active time slots must be selected to a higher value the more connectivity is provided for said particular node so that a receipt of a synchronization packet is possible on a plurality of transmission paths if said node has a high connectivity to a large number of other nodes. Vice versa, the energy consumption for receiving time slots can be reduced significantly if the connectivity is reduced. Generally, it is further to be understood that said particular embodiment is not only applicable to the transmission of a synchronization packet but also to other data to be transmitted via said network and thus the energy consumption of the network during regular operation is significantly reduced.

According to a further preferred embodiment the frame comprises m time slots and the method further comprises the step: Defining one of said m time slot within said frame to be a zero time slot, wherein in said zero time slot all nodes of the network are simultaneously active to listen to receive a signal signalizing the presence of an extension node connected to the network in the course of an extension. By this embodiment a common time slot is predetermined within said network and this significantly facilitates to extend the network in the course of installation or in course of maintenance or addition of further nodes to the network after installation. By this, in a network which already was installed to be ready for operation and is synchronized it is possible to easily install additional nodes (so-called "extension nodes") if the network is to be extended and to integrate these extension nodes to regular operation and synchronization of the network.

Still further, it is preferred to include the steps: Extending said network after initialization by connecting at least one extension node to said network, Sending a signal from each extension node during said zero time slot to at least one node in neighborhood of the extension node, wherein said signal signalizes the presence of the extension node and preferably data describing characteristics of said extension node, Wherein in case that a plurality of extension nodes are connected to said network the extension nodes are connected to the network one after the other. Using this particular method for extending the network it is avoided to connect the plurality of interconnected nodes, like e.g. an extension network, to the existing network in one single step since in such a case a conflict may arise in the course of initialization and synchronization of the extension nodes. To overcome this problem, the extension nodes are connected one after the other so that a single extension node is to be integrated and synchronized with the existing network at one time only.

According to a further preferred embodiment in said TDMA synchronization scheme the time slots are associated to the nodes such that each node is associated to at least one sending time slot for transmission of signals by said node into the network, each node is associated to a plurality of receiving time slots for listening to signals from the network, wherein in said plurality of receiving time slots of a node comprises, preferably consists of, the sending time slots of the nodes in a predetermined neighborhood distance of said node. According to this particular embodiment a type of deterministic distributed TDMA (ddTDMA) scheduling algorithm is used which is particularly adapted and configured for high signal speed and low energy consumption. To this regard the sending time slots of the nodes and the receiving time slots of the nodes are determined in such a way that the nodes need not to be active during the whole frame but may save energy in a sleeping mode in a plurality of time slots of a frame. Nevertheless, following the specific selection of receiving time slots of the nodes in neighborhood to the particular node, the signal speed is not adversely affected by this energy saving scheme and still further the safety of the signal transmission can be set to a sufficient level for life saving equipment in aircraft. To this extent, the neighborhood may be defined such that all those nodes which are in radio distance to a particular node are defined to be nodes in neighborhood of said particular node. However, the definition of neighborhood may be set to another value as well, e.g. to all nodes which are in a range of a fraction of said radio distance, e.g. 75, 50 or 25% of said radio distance. In particular, the network can be set up in such a way that the neighborhood of the nodes are defined similar for all nodes or in a specific setup, wherein a first group of nodes is associated with a neighborhood of nodes in a first range, e.g. the total radio distance of these nodes and a second group of nodes is associated with a second, different range, e.g. 50% of the radio distance of these nodes, wherein the total radio distance of all nodes may be identical. By this, a specific setup is provided wherein sufficient redundancy is provided for all nodes of the network by those nodes having a large neighborhood but at the same time significant energy is saved in that not all the nodes are driven with such a large neighborhood but instead only some selective nodes.

According to a further preferred embodiment the nodes are connected to each other to form a matrix network, wherein in said matrix network two nodes are connected to each other via a first direct path which is the connection between the two nodes including a minimum number of nodes and via at least one bypass path including not more than a predetermined number of additional nodes than the direct path, preferably not more than two additional nodes. In this particular set up a preferred trade-off between signal speed, redundancy and energy consumption is provided in that at least one bypass path is present for signal trans-mission between the nodes and this bypass path includes a number of nodes which is not higher than the nodes of the original paths plus a predetermined number of additional nodes. By this, the signal speed via the bypass path is maintained on a certain level which is acceptable for signal transmission in e.g. an emergency situation within an aircraft. The predetermined number of additional nodes may be set to 2, 3, 4, 5 or 6 nodes to ensure such sufficient signal transmission speed but in particular embodiments even higher number of additional nodes may be acceptable. Generally, it is to be noted that the smaller the number of additional nodes the higher the number of receiving slots of all nodes within one frame and thus the shorter the time for a broadcast transmission. Still further, the energy consumption may be higher in case of a higher number of receiving slots.

According to a further preferred embodiment at least two nodes are associated to one shared sending time slot for transmission of signal by said nodes into the network, and/or wherein at least two nodes are associated to one shared receiving time slots for listening to signals out of the network, wherein preferably said at least two nodes are arranged in the network in such a way that they are not neighbored nodes. According to this preferred embodiment two possible advantages are realized within the network. First, in case that the two nodes having the identical receiving slot both may be in distance to another slot of the network sending during said receiving slot so that a redundancy without any loss of transmission speed is provided within the network. Second, if the nodes are not in neighborhood to such a common node with a sending slot (i.e. the two nodes sharing the same receiving slot are in distance to each other corresponding to the double total radio distance of the nodes between these nodes) it is possible to use such receiving slot for different parts of the network without any conflict and thus the number of slots within one frame can be reduced.

According to a further preferred embodiment of the method the invention is further improved in that in a first step of the initialization process, each node determines a list of its neighbored nodes by determining the signal strength of a signal received from other nodes, wherein a node is added to said list of neighbored nodes if the signal strength of its signal is above a predetermined level and/or each node determines a list of its neighbored nodes by receiving their synchronization packets and each node registers the sending time slots of its neighbored nodes and determines a number of sleeping time slots wherein in a sleeping time slot the node neither is active to send a signal nor is active to receive signals, said number of sleeping time slots being selected under the time slots wherein none of the neighbored nodes has a sending time slot. With this preferred embodiment an optimization and a trade off between transmission speed, transmission safety and energy consumption is made during the initialization process in the network. Generally, it is desired to include as many sleeping time slots as possible under a predetermined limit of a minimum transmission speed within the network and a minimum redundancy factor. The transmission speed can be understood to include both a broadcast transmission, wherein one signal is to be transmitted to all nodes within the network and the characteristic minimum time is the time period during which all nodes have received the signal. Further, a point-to-point communication should be considered under the transmission speed and in such case the time required for transmission of a signal from one node to another node within the network shall be the basis for determining the transmission speed. The redundancy factor could be calculated as a specific stress test of the network wherein failure of any nodes within the network is assumed and then determined whether under such failure still a signal transmission to all nodes within the network is generally possible or is possible within a predetermined time limit. A redundancy factor could then be characterized as a number of any arbitrary node within the network which can fail without that such signal transmission is no longer possible.

Still further it is preferred that in a second step of the initialization process each node transmits a synchronization packet during its sending slot and each node is active during the sending slots of its neighbored nodes for receiving a synchronization packet, and each node is active during at least one dedicated slot of each or a predefined set of frames. This dedicated slot is further referred to as slot zero, each node is inactive during the remaining time slots of the frame, wherein based on the sending and the receipt of said synchronization packets the synchronization of the network is maintained and broken links between two nodes or broken nodes are detected by each node. According to this preferred embodiment the time slots of all frames or a set of frames is divided into one or more sending slots, one or more receiving slots and a common slot zero wherein during all these time slots the node is active and is inactive during the remaining time slots. By this, it is first ensured that each node is active to send signal to its neighbored nodes and to listen to signals from its neighbored nodes. Second, all nodes of the network are adapted to listen to a general information during a common time slot which is identical for all the nodes. This common time slot zero may be used for any data related to the topography of the network in the course of extension of the network or any other general function related to the topography or the communication within the network. To this extent, it is to be understood that the number of sending slots and the number of receiving slots may be different for each node within the network or may be different for a first set of nodes compared to a second set of nodes of the network. Still further, the number of sending time slots and receiving time slots may be identical for all frames but may be different for the frames as well, e.g. in that a frame of a first type is alternating with a frame of a second type having a different number of sending and/or receiving time slots than the first type of frame. Finally, the common time slot zero may be present in each frame or may be present in each second or each third frame only.

It is further preferred that each node is associated at least one sending time slot, at least one receiving time slot and a plurality of sleeping time slots and wherein after the initialization of the network the number of sleeping time slots is set to a calculated optimum number in an optimization process comprising the steps of:
  a) Determining a first response time required for a broadcast transmission to forward a single data package by a node-to-node transmission from the hub node to all nodes within the network at a first number of sleeping time slots,
  b) Comparing the first response time determined in step a) with a predetermined maximum response time and increasing the number of sleeping time slots if the first response time is below the predetermined maximum response time and/or reducing the number of sleeping time slots if the first response time is above the predetermined maximum response time,
  c) Repeating steps a)-b) with the increased number of sleeping time slots as first number of sleeping time slots until the total number of sleeping time slots cannot be further increased in step b).

According to this preferred embodiment an optimization process for determining an ideal trade off for a given network configuration is applied to the network during the initialization process. This optimization process determines a maximum number of sleeping time slots for all nodes which is acceptable without exceeding a predetermined time limit for a broadcast transmission within the network. It is to be understood that this optimization process may be applied to all nodes and thus result in a number of sleeping time slots which is similar for all nodes or my be applied to each single node or single set of nodes and thus result in an optimized number of sleeping time slots for each node or a set of nodes. Whereas in the former approach the initialization process may take a short time only and may be adapted to different network topographies in a quick and easy way the latter procedure will result in a detailed optimization of the sleeping time slots for each node within the network and thus produce a very efficient setup of the network at low energy consumption. Whereas it is described that the optimization uses a broadcast transmission from a hub node to all other nodes in the network it is to be understood that the optimization may in the same way be based on a point-to-point transmission from an arbitrary node in the network to another node in the network as well and may compare one single or a multiplicity of such point-to-point transmissions for the optimization process.

Still further, it is preferred that a hub node sends a data package during a number of hub sending time slots within a single frame, wherein in case of two hub sending time slots these being separated by at least one intermittent time slot, wherein a hub node is a dedicated node during which sending slots all nodes in the neighbourhood of the hub must be active to listen and wherein after the initialization of the network the number of hub sending time slots within said frame is set to a calculated optimum number in an optimization process comprising the steps of:

a) Determining a first response time required for a broadcast transmission to forward a single data package by a node-to-node transmission from the hub node to all nodes within the network at a first number of hub sending time slots, b) Comparing the first response time determined in step a) with a predetermined maximum response time and reducing the number of hub sending time slots and/or reducing the radio range by reducing transmitting power if the first response time is below the predetermined maximum response time and/or increasing the number of hub sending time slots and/or increasing the radio range by increasing the transmission power if the first response time is above the predetermined maximum response time;

c) Repeating steps a)-b) with the selected lower number of hub sending time slots as first number of hub sending time slots until the number of hub sending slots cannot be further reduced in step b).

According to this preferred embodiment an optimization of the number of the hub sending time slots is conducted in order to meet a given response time for transmitting a data package within the network from a hub node to all other nodes in the network. It is to be understood that this optimization may be conducted alternatively or in addition to the optimization processes described beforehand. Thu, a further significant parameter affecting efficiency and energy consumption of the network is optimized in that the number or frequency of sending time slots of a single or a number of hub nodes within the network is determined. Generally, the higher the number of sending time slots (i.e. the smaller the number of intermittent time slots between two sending slots of a hub at a given total number of slots per frame) is selected the higher will be the transmission speed and the energy consumption of the network. Thus, when setting up the network for a given lower limit of transmission speed (corresponding to a given upper limit of response time) the optimization of the number of hub sending slots may significantly reduce the energy consumption. It is to be understood that this optimization process may be conducted independent from the optimization of the sleeping time slots of each node within the network.

The optimization process can be further improved in that in step a) an average response time is calculated as the first response time, the average response time being calculated as mean value based on a number of broadcast transmissions each initiated at random different starting times. According to this preferred embodiment a fast optimization is achieved in that the number of sleeping time slots or hub sending time slots, respectively, is changed depending on the average transmission speed within the network observed by at least two test-runs. In particular, this embodiment takes into account that a signal to be broadcast into the network may be received by a hub node immediately before or after a hub sending slot and this significantly affects the transmission speed in the network depending on the frequency of hub sending slots.

According to a further preferred embodiment the method according to the invention is further improved in that the data is transmitted between the nodes using at least two different channels in the ISM band and the channels used by all nodes are changed on a predetermined frequent basis and/or two node automatically change to a different communication channel for their upcoming communication in case the communication of the two adjacent nodes gets distorted by e.g. interference. It is generally further preferred that each channel uses direct sequence spread spectrum to prevent narrowband interference. With this further characteristics, in terms of redundancy the invention takes advantage of frequency diversity against e.g. multi-path fading or interference, spatial diversity, (true mesh, multiple paths at each hop), and temporal diversity (secure link-layer ACK). This results in several advantages over single-channel protocols in terms of reliability, longer effective range and more available bandwidth. Further, according to the invention the communication may be encoded, so that it becomes feasible to monitor and protect the data against falsification.

Generally, it is to be understood that the method according to the invention provides the possibility to use different network configurations to trade response time versus energy consumption. Each network configuration defines the amount of hub sending slots in every frame. A hub sending slot is a dedicated slot during which all nodes in the neighborhood of the hub must be active to listen. By increasing the amount of hub sending slots, energy consumption increases and response time decreases. Further, the response time decreases and the energy consumption increases for higher transmission power. The transmission power may preferably adapted individually for each node and hub to meet predetermined criteria like minimum signal transmission time, maximum signal transmission time and/or maximum energy consumption. This will result in different transmission power settings for each node and hub within the network.

According to a further preferred embodiment the network changes from a first network configuration to a second network configuration wherein the first and second network configuration are different in the trade off of response time versus energy consumption in that The first network configuration defines a different number of hub sending slots in every frame and/or individually different transmitting power for each individual node or a number of individual groups of nodes than the second network configuration, The first network configuration defines a different number of sleeping time slots for each node in every frame than the second network configuration, The first network configuration defines a different transmitting power for each node and hub than the second network configuration, The first network configuration defines a different number of receiving time slots for each node in every frame than the second network configuration, The first network configuration defines a different range of neighborhood for each node than the second network configuration, The first network configuration defines a different number of sending time slots for each node in every frame than the second network configuration, and/or the first network configuration has a frame configuration wherein a first set of frames has a first time slot configuration and a second set of frames has a second time slot configuration different from the first time slot configuration and the second network configuration has a frame configuration different from the frame configuration of the first network configuration.

This embodiment will allow the method to adapt to two or more different operating situations requiring different properties of the network. The two network configurations may e.g. be a low energy configuration (having a first, long response time) and a fast transmission configuration (having a second, shorter response time). The two network configurations may be preconfigured and stored in the network or may be configured in an initialization and optimization process upon switching from one configuration to the other.

Another aspect of the invention is An emergency oxygen supply system for passenger of an aircraft, comprising
  A plurality of emergency oxygen devices,
    a wireless network comprising a plurality of nodes, wherein each node is associated with one of said emergency oxygen devices,
    each node comprising a controller with a memory device, said controller being adapted to store a time slot scheme within a time frame in said memory device,
    said network further comprising a main controller coupled to a hub node, wherein said main controller and the controller of the nodes are adapted to initialize said network using a TDMA synchronization scheme to associate sending and receiving time slots within a time frame to each node,
    Wherein the controller of each node is adapted to be active to wireless receive signals during a first set of receiving time slots of said frame from the nodes to at least a plurality of nodes in a predetermined neighborhood distance to said node,
    Wherein further upon receipt of a decompression signal the main controller is adapted for wireless sending an activation signal via said hub node to the other nodes,
    Wherein the controller of at least a plurality of said nodes after having received said activation signal during a time slot is adapted to send said activation signal during a sending time slot associated to said node to the nodes in the predetermined neighborhood distance to said node.

This emergency oxygen supply system may be further improved according to claims 17-20.

Still further, the invention comprises an activation and maintenance device for a plurality of separate and distanced functional units in an aircraft cabin, comprising
  a wireless network comprising a plurality of nodes, wherein each node is associated with one of said functional units,
  each node comprising a controller with a memory device, said controller being adapted to store a time slot scheme within a time frame in said memory device,
  said network further comprising a main controller coupled to a hub node, wherein said main controller and the controller of the nodes are adapted to initialize said network using a TDMA synchronization scheme to associate sending and receiving time slots within a time frame to each node,
  Wherein the controller of each node is adapted to be active to wireless receive signals during a first set of receiving time slots of said frame from the nodes to at least a plurality of nodes in a predetermined neighborhood distance to said node,
  Wherein further each controller is adapted for wireless sending data from its associated node to the other nodes,
  Wherein the controller of at least a plurality of said nodes after having received said data during a time slot is adapted to send said data during a sending time slot associated to said node to the nodes in the predetermined neighborhood distance to said node.

Generally, it is to be understood that the invention is directed to a signal trans-mission system for transmission of signals between a plurality of transmitters within an aircraft, wherein a transmitter is to be understood as a node adapted for sending and receiving signals, wherein this system for signal transmission may comprise the characteristics of the system for emergency oxygen supply described beforehand and is preferably adapted to operate according to a method according to the invention as described beforehand.

It is further preferred that a node of the network is associated
  To a control unit of a portable breathing equipment device and said controt unit is adapted to send data comprising information about the oxygen content of an oxygen source within said device or maintenance cycles of said device or the location of said device via said node,
  To a control unit of a personal protective equipment device and said control unit is adapted to send data comprising information about the oxygen content of an oxygen source within said device or maintenance cycles of said device or the location of said device via said node, and/or
  To a seat occupation control unit and said control unit is adapted to send data comprising information about occupation of a single or a plurality of passenger seats of the aircraft via said node.

With this preferred embodiment a particular problem associated with cabin interior systems installed in aircraft is addressed wherein such cabin interior systems are used by different airlines. These airlines may apply different maintenance cycles, pressure or filing limits of an oxygen source of such systems or different locations to store such portable breathing equipment, (PBE) or personal protective equipment (PPE). The preferred embodiment addresses this particular issue associated with the need to manufacture such PBE and PPE equipment in a common design and manufacturing process but to nevertheless provide the option to handle these units with individual maintenance and safety regulations. For example, the preferred embodiment allows a first airline to conduct a safety check of such PBE applying a first pressure limit in the oxygen source of the PBE and to transmit the pressure or a safety signal via said node and the network to a control panel allowing checking all PBE on board of an aircraft at a glance whereas a second airline may conduct such safety check at a different, second pressure level in the same comfortable way using the same equipment. Thus, the need to pull out each individual PBE in the course of a safety check on board of an aircraft is avoided. Still further, the node may be physically mounted to the PBE or PPE and thus allow to quickly find the safety equipment via localization of the node in case of an emergency. This embodiment uses the capability of such wireless networks to easily localize the position of a single node by neighborhood information and to thus allow to show said position on a display or the like.

As further important aspect of this preferred embodiment the association of a node to one or a plurality of seats for providing a seat occupation signal is solving an emerging safety problem on board of aircraft. Particular in very large aircraft it is unconsuming a prone to errors to count the number of passengers manually by the cabin crew. Further, in particular emergencies situations or in the course of preventing injuries it is required to allow the cabin crew to gather information of whether any passenger is not on his passengers seat but may instead be standing of or walking through the cabin or attend a rest room or the like. The preferred embodiment uses particular advantage that the network according to the invention may comprise a large number of nodes without negatively effecting the energy consumption or transmissions beat within the network. This allows to a associate a node to a single seat or a number of seats like e.g. the seats in a row or a seats beside a gangway in a single row. The seat occupations sensor will than send a binary signal of whether the seat is occupied or not e.g. by a fourth sensor or a heat sensor or a capacitive sensor implemented in the seat cushion and will thus allow the cabin crew to have a quick overview of the seat occupation in the hole cabin in an emergency or an injury preventing situation.

A preferred embodiment of the invention is described with reference to the enclosed Figures.

Figure 5:
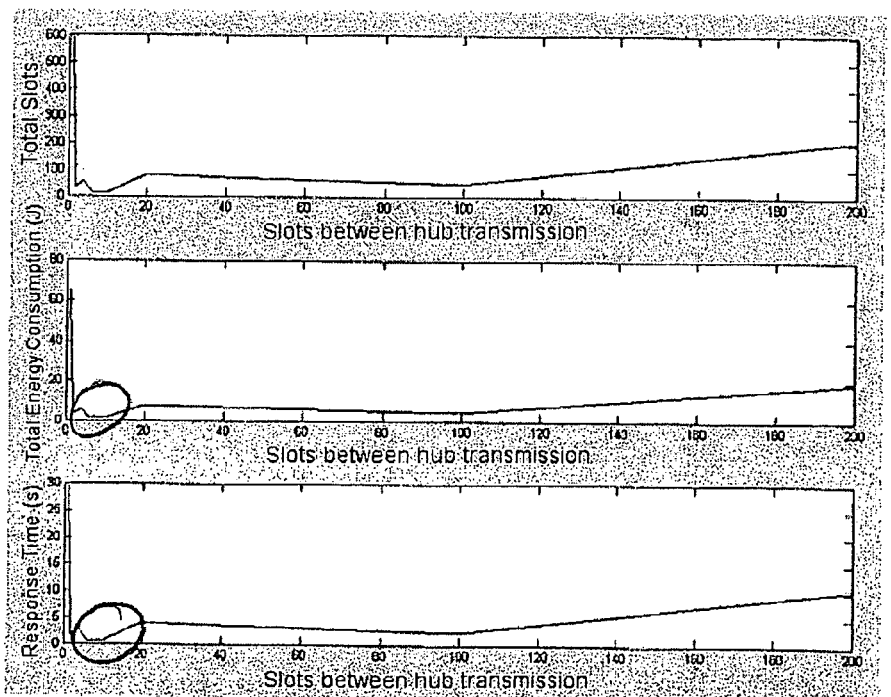
Figure 6:
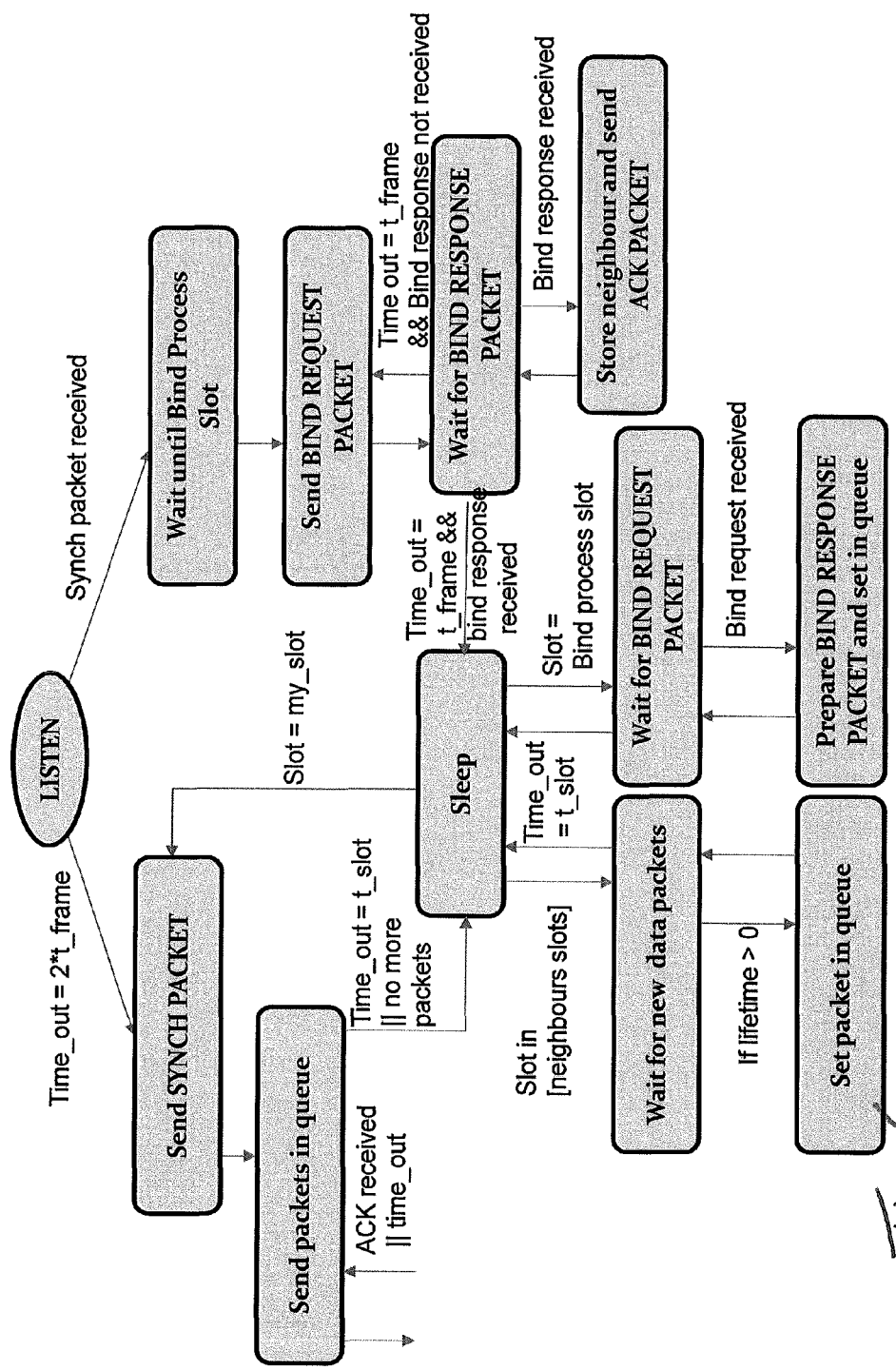

FIG. 1 shows a network configuration of a preferred embodiment of the invention, FIG. 2 is a table wherein a frame within the network configuration of FIG. 1a is shown including the sending slots for each node, FIG. 3 is a diagram plotting the response time over the slots between two consecutive hub transmissions, FIG. 4 is a first diagram of parameters of a broadcasting setup in a given network at a first broadcasting range, FIG. 5 is a second diagram of parameters of a broadcasting setup in the network of FIG. 4 at a second, higher broadcasting range, and FIG. 6 is a synchronizing scheme within a network for avoiding packet collision.

Generally, according to the invention a broadcasting method and a broadcasting system is provided applying a synchronized flooding as a routing algorithm. The time is divided in frames made up of slots, wherein every node of the network has preferably one sending slot to transmit within said frame and has receiving slots during the sending slots of its neighbor nodes. Only the hub nodes have more than one sending slot within said frame. During those slots, which are neither sending nor receiving slots, the nodes sleep and thus save energy. Further, preferably, a bind process slot is provided within a frame to allow integration of additional nodes into the network by initialization signal transmission within said bind process slot. In such a network, the energy consumption, in particular defined by the number of sending slots per node and the broadcasting power of each node, may be increased until a predetermined response time defined to be the maximum transmission time of a signal from the first transmission of a signal until receipt of this signal by all nodes within the network is met.

In FIG. 1 a network comprising a total of 15 nodes 1-15 is shown. Each node is referenced by two numbers, wherein the first number is the identification code of the node and is unique for each node within the network and the second number is the sending slot of the node. The nodes are shown to be interconnected via lines but it is to be understood that the transmission between the nodes is conducted as a wireless transmission. The radio distance of each node may cover the nodes in direct adjacent a arrangement only or nodes in a greater distance of the node, i.e. behind the nodes in direct adjacent arrangement.

As can be seen from FIG. 1, the node with the identification code 6 is configured to be a hub node and has two sending slots 3 and 6. In contrast to this, all other nodes 1-5, 7-15 are regular nodes having one single sending slot.

The transmission time within the network is divided into frames wherein one frame comprises a total of 8 slots 0-7 as can be seen in FIG. 2. During slot 0 no node installed within the network is active for sending out signals but all nodes in the network are active to listen for receiving signals. This slot zero is used for integrating additional nodes into the network by way of receiving an initialization data of such a new node to be installed during slot 0.

The slots 1-7 are defined as sending slots for the nodes 1-15. As can be seen, the nodes share these slots in such a way that e.g. slot 1 is used as a sending slot for the nodes 1, 2, 5, 12 where as slot 6 is used as a sending time slot for node 6 only. Generally, the nodes of the network are shown to have different numbers of sending time slots and the time slots are shown to be shared by different numbers of nodes.

The network configuration represented in FIG. 1 shows a possible dd-TDMA-based slot assignment wherein the neighbor nodes are joined through a line and reliability is achieved through several redundant paths to each node. It is to be understood that the neighborhood of the nodes is defined to be the total radio range of each node, e.g. the neighborhood of a node consist of all those nodes which distance is less than or equal to the total radio range of the respective node. The radio power of the nodes maybe identical for all nodes or maybe different, in particular nodes with a high radio power can be installed in locations with a low node density defined as nodes per square meter whereas nodes having a lower radio power maybe installed in locations having a higher node density. The nodes in the network shown in FIG. 1 are configured such that each node is active to listen during the sending time slots of its neighbored nodes and is inactive to safe energy during all other slots except for slot 0 and its own sending time slot. Thus, when assuming that the total radio range extends over the directly adjacent nodes only, node #11 will have the receiving time slots 1, 2, 3, 5 and 6 and will thus have a number of one sleeping time slot (slot 4) whereas node #11 will have the receiving time slots 4 and 7 and a number of four sleeping time slots (slots 2, 3, 5, 6). By this, a type of synchronized flooding using a DdTDMA-based scheduling algorithm is provided by the such configured network. The advantages of this synchronized flooding is a collision-free transmission, an increased number of paths to a node for enhanced reliability, an efficient use of bandwidth by using a shared slots. The network is scalable for different dimensions and extensions and allows simple implementation of additional nodes. Finally, no time or energy costs are required for routing maintenance within the network.

Using the such defined protocol, the response time and the energy consumption can be traded off in a very accurate and predictive manner for arbitrary network topologies. As a third parameter this trade-off may consider reliability of the network. This trade off will be made more clear by way of an example below.

Response times can be predicted and tuned in a reliable fashion for a given application using the previously described protocol. Simulations also give an estimate of the system's energy consumption for a broadcast or point-to-point transmission, or even a determined period of time. Also, it is possible to measure the reliability of the network configuration based on the number of paths from a source to a destination node and the number of hops of every path. The sensor network can be arranged in a coordinate system; therefore, it is possible to have an estimate of the real distances between the individual nodes.

The number of time slots between the hub transmissions can be estimated by means of the new protocol. Thus, the maximum broadcast delay can be predicted and tuned to desired values. The protocol also takes into account a corrupt probability for each byte, representing distortions such as interference. Packet-lifetime is defined as the number of times that a packet can be forwarded from one node to another node in its neighborhood, thus preventing a packet being retransmitted forever. Lower lifetimes save energy, although this value must be high enough to ensure reliability. The user can also establish some periods of sleep for all the nodes in the network. The length of the period and the number of slots between two consecutive sleep periods and/or the transmission power are parameters. They are useful to save energy.

By means of a transmission simulation the protocol and/or the transmission power can be tuned to the individual application and works as follows:

Initially, the simulator builds the sensor network by setting each sensor node in the coordinate system.

Then, depending on the radio power, the simulator determines which nodes are direct neighbors. The neighborhood of a node consists of all the nodes whose distance to itself is less than or equal to the radio range.

Different network schemes are obtained by using a list of different numbers of time slots between two consecutive hub transmissions, which is configured by the user. For example, if one of the list values is 2 (two sensor node slots between two consecutive hub slots), all slots that are multiples of 3 will be assigned to the hub with the remainder being assigned to the other nodes by the dd-TDMA algorithm. A plot of the response time versus the slots between hum transmission is shown in FIG. 3, wherein two different corruption probabilities were examined in a simulation.

The dd-TDMA algorithm then runs to find the optimum TDMA assignment. Once this algorithm has finished, the frame can be adjusted to the minimum number of slots needed.

The main task of the simulator can now begin. Three situations can be simulated:

Broadcast transmission: The hub must send a broadcast packet; therefore the program simulates all transmissions required until all the nodes in the network have received the packet.

Point-to-point transmission: A node must send a packet to another node; therefore the program simulates all transmissions required until the packet arrives at the destination node.

Network working over a pre-defined period of time: the simulator estimates the energy consumed by each node in the network during a period of time, where there is no packet transmission.

For the two first cases, the simulator computes the number of slots required to complete the packet transmission process, which is then used to calculate the response time. The simulator also estimates the energy consumption of the global system and then it produces its results in the form of several charts from which the most suitable frame scheme can be deduced. The number of slots between hub transmissions can be determined on the basis of these graphics to achieve acceptable time response and energy consumption.

The user can also try different combinations of sleep period length and number of slots between two consecutive sleep periods. The lowest energy consumption, that fulfils the established requirement of the response time, will be the best configuration.

In summary, the network parameters are then fitted by the simulator to build an optimum system in terms of speed, energy, and reliability.

In such network, the synchronized flooding algorithm may be conducted and devided up into generally two phases: In a first phase every node determines its slots according to the dd-TDMA-based algorithm and safes the transmission slots of its neighbors. In the course of this each node will determine the slots in which it can be inactive thus forming the bases for a sleep scheme to safe energy within the network. This first phase is called initialization.

In a second phase after the first phase each node transmits a synchronization packet during its sending slot to maintain node synchronization and detect broken links and/or nodes. Further, each node may transmit some information packet during this sending slot. A node may have one single sending slot or more sending slots. Usually, nodes having more than one sending slot are defined to be hub nodes within the network. Each node listens for packet's send by other nodes in its neighborhood during the receiving time slots determined in the first phase and additionally during the slot 0. This slot 0 is reserved to find new neighbors which are connected wirelessly to the network but not yet installed. No node is assigned a sending time slot in slot 0. During all other slots within the time frame the node sleeps and safes energy. Generally, it is to be understood that the such defined slot scheme may be applied to all frames but may alternatively be applied to only a subset of frames, e.g. such slot scheme of a node may be applied to every second or every third frame wherein the node is completely in active in the corresponding one ore two frames in between to further safe energy.

FIG. 4 shows a first set of diagrams representing transmission parameters under a first broadcasting range of each node. As can be seen, a rather low energy consumption (encircled) is achieved at the minimum response time (encircled) setting the number of slots between two consecutive hub transmissions to approximately 3-5 slots. However, the response time has an absolute value of approximately 4 seconds which is above the maximum response time.

FIG. 5 shows a second set of diagrams representing transmission parameters within the same network as that of FIG. 4 under a second broadcasting range of each node which is larger than the first broadcasting range. As can be seen, a somewhat higher energy consumption (encircled) is achieved at the minimum response time (encircled) setting the number of slots between two consecutive hub transmissions to approximately 5-10 slots. However, the response time has an absolute value of approximately 1 second which is below the maximum response time and thus acceptable.

FIG. 6 shows a scheme of a synchronization scheme within a network according to the invention. As can be seen, packet collision is avoided by synchronization. Every node in the network sends a synchronization packet with its ID at the beginning of its transmission slot. This ID is also the number of its transmission slot. If a new node listen to this packet, it will know the slot at this moment.

The invention claimed is:

1. A method for activating and maintaining a plurality of separate and distanced functional units in an aircraft cabin, in particular an emergency oxygen supply system for passengers of an aircraft, comprising the steps of:

initializing a wireless network comprising a plurality of nodes, wherein each node is associated with a device, in particular a remotely operable device wherein said initializing comprises associating each node a sending time slot within a time frame using a TDMA synchronization scheme, wherein each node is active to send signals during its sending time slot and is active to receive signals during a first set of time slots comprising a number of time slots of said frame, wherein the sending time slot of a node is different from the sending time slots of at least a plurality of its neighbored nodes, wherein a neighbored node of a node is defined to be within a predetermined distance to said node, sending an activation signal from one of the nodes to at least the plurality of nodes in a predetermined neighborhood distance to said node, wherein each node after having received said activation signal transmits said activation signal during the sending time slot associated to said node to at least one neighbored node, wherein each node is associated at least one sending time slot, at least one listening time slot and a plurality of sleeping time slots and wherein after the initialization of the network the number of sleeping time slots is set to a calculated optimum number in an optimization process comprising the steps of:

a) determining a first response time required for a broadcast transmission to forward a single data package by a node-to-node transmission from the hub node to all nodes within the network at a first number of sleeping time slots, b) comparing the first response time determined in step a) with a predetermined maximum response time and increasing the number of sleeping time slots if the first response time is below the predetermined maximum response time or reducing the number of sleeping time slots if the first response time is above the predetermined maximum response time, repeating steps a)-b) with the increased number of sleeping time slots as the first number of sleeping time slots until the total number of sleeping time slots cannot be further increased in step b).

2. Method according to claim 1, further comprising the steps of:

sequentially transmitting a synchronization packet by each node of the plurality of nodes during the number of s sending time slot(s) associated to the node, wherein the frame consists of m time slots and each node is active to listen during a multiple number of n receiving time slots of said frame to receive data from the nodes in a predetermined neighborhood distance and is inactive during the remaining m-n-s number of sleeping time slots of said frame, wherein n<m, and wherein said n time slots are different for at least two nodes of said plurality of nodes.

3. Method according to claim 1, wherein said frame comprises m time slots, further comprising the step of:

defining one of said m time slots within said frame to be a zero time slot, wherein in said zero time slot all nodes of the network are simultaneously active to listen to receive a signal signalizing the presence of an extension node connected to the network in the course of an extension.

4. Method according to claim 3, further comprising the steps of:

extending said network after initialization by connecting at least one extension node to said network, sending a signal from each extension node during said zero time slot to at least one node in neighborhood of the extension node, wherein said signal signalizes the presence of the extension node, wherein in case that a plurality of extension nodes are connected to said network the extension nodes are connected to the network one after the other.

5. Method according to claim 1, wherein in said TDMA synchronization scheme the time slots are associated to the nodes such that each node is associated to at least one sending time slot for transmission of signals by said node into the network, each node is associated to a plurality of receiving time slots for listening to signals from the network, wherein said plurality of receiving time slots of a node comprises the sending time slots of the nodes in a predetermined neighborhood distance of said node.

6. Method according to claim 1, wherein the nodes are connected to each other to form a matrix network, wherein in said matrix network two nodes are connected to each other via a first direct path which is the connection between the two nodes including a minimum number of nodes, via at least one bypass path including not more than a predetermined number of additional nodes than the direct path 7. Method according to claim 1, wherein at least two nodes are associated to one shared sending time slot for transmission of signals by said nodes into the network, or wherein at least two nodes are associated to one shared receiving time slot for listening to signals out of the network, or wherein at least two nodes are associated to both one shared sending time slot for transmission of signals by said nodes into the network and one shared receiving time slot for listening to signals out of the network, wherein said at least two nodes are arranged in the network in such a way that they are not neighbored nodes.

8. Method according to claim 1, wherein during the initialization process each node determines a list of its neighbored nodes either by determining the signal strength of a signal received from other nodes, wherein a node is added to said list of neighbored nodes if the signal strength of its signal is above a predetermined level or by receiving their synchronization packets, or by both determining the signal strength of a signal received from other nodes and by receiving their synchronization packets, each node registers the sending time slots of its neighbored nodes and determines a number of sleeping time slots wherein in a sleeping time slot the node neither is active to send a signal nor is active to receive signals, said number of sleeping time slots being selected under the time slots wherein none of the neighbored nodes has a sending time slot.

9. Method according to claim 1, wherein during the initialization process each node transmits a synchronization packet during its sending slot, and each node is active during the sending slots of its neighbored nodes for receiving a synchronization packet, and each node is active during at least one dedicated slot of at least one frame, each node is inactive during the remaining time slots of the frame, wherein based on the sending and the receipt of said synchronization packets the synchronization of the network is maintained and broken links between two nodes or broken nodes are detected by each node.

10. Method according to claim 1, wherein in step a) an average response time is calculated as the first response time, the average response time being calculated as a mean value based on a number of broadcast transmissions each initiated at random different starting times.

11. Method according to claim 1,
wherein data is transmitted between the nodes using at least two different channels in the ISM band and the channels used by all nodes are changed on a predetermined basis.

12. Method according to claim 1,
wherein two nodes automatically change to a different communication channel for their upcoming communication in case the communication of the two adjacent nodes gets distorted.

13. Method for activating and maintaining a plurality of separate and distanced functional units in an aircraft cabin, in particular an emergency oxygen supply system for passengers of an aircraft, comprising the steps of:
  initializing a wireless network comprising a plurality of nodes, wherein each node is associated with a device, in particular a remotely operable device wherein said initializing comprises associating each node a sending time slot within a time frame using a TDMA synchronization scheme,
    wherein each node is active to send signals during its sending time slot and is active to receive signals during a first set of time slots comprising a number of time slots of said frame,
    wherein the sending time slot of a node is different from the sending time slots of at least a plurality of its neighbored nodes, wherein a neighbored node of a node is defined to be within a predetermined distance to said node,
    sending an activation signal from one of the nodes to at least the plurality of nodes in a predetermined neighborhood distance to said node,
    wherein each node after having received said activation signal transmits said activation signal during the sending time slot associated to said node to at least one neighbored node, and
  wherein a hub node sends a data package during at least two hub sending time slots within a single frame, said two hub sending time slots being separated by at least one intermittent time slot, wherein a hub node is a dedicated node during which sending slots all nodes in the neighborhood of the hub must be active to listen and
  wherein after the initialization of the network the number of hub sending time slots within said frame is set to a calculated optimum number in an optimization process comprising the steps of:
    a) determining a first response time required for a broadcast transmission to forward a single data package by a node-to-node transmission from the hub node to all nodes within the network at a first number of hub sending time slots,
    b) comparing the first response time determined in step a) with a predetermined maximum response time and reducing the number of hub sending time slots or reducing the radio range by reducing transmitting power if the first response time is below the predetermined maximum response time or increasing the number of hub sending time slots or increasing the radio range by increasing the transmission power if the first response time is above the predetermined maximum response time;
    c) repeating steps a)-b) with the selected lower number of hub sending time slots as the first number of hub sending time slots until the number of hub sending time slots cannot be further reduced in step b).

14. Method for activating and maintaining a plurality of separate and distanced functional units in an aircraft cabin, in particular an emergency oxygen supply system for passengers of an aircraft, comprising the steps of:
  initializing a wireless network comprising a plurality of nodes, wherein each node is associated with a device, in particular a remotely operable device wherein said initializing comprises associating each node a sending time slot within a time frame using a TDMA synchronization scheme,
    wherein each node is active to send signals during its sending time slot and is active to receive signals during a first set of time slots comprising a number of time slots of said frame,
    wherein the sending time slot of a node is different from the sending time slots of at least a plurality of its neighbored nodes, wherein a neighbored node of a node is defined to be within a predetermined distance to said node,
    sending an activation signal from one of the nodes to at least the plurality of nodes in a predetermined neighborhood distance to said node,
    wherein each node after having received said activation signal transmits said activation signal during the sending time slot associated to said node to at least one neighbored node, and
  wherein the network changes from a first network configuration to a second network configuration wherein the first and second network configurations are different in the trade off of response time versus energy consumption in that
    the first network configuration defines a different number of hub sending slots in every frame than the second network configuration,
    the first network configuration defines a different number of sleeping time slots for each node in every frame than the second network configuration,
    the first network configuration defines a different number of receiving time slots for each node in every frame than the second network configuration,
    the first network configuration defines a different range of neighborhood for each node than the second network configuration,
    the first network configuration defines a different number of sending time slots for each node in every frame than the second network configuration, or
    the first network configuration has a frame configuration wherein a first set of frames has a first time slot configuration and a second set of frames has a second time slot configuration different from the first time slot configuration and the second network configuration has a frame configuration different from the frame configuration of the first network configuration.

15. Method for activating and maintaining a plurality of separate and distanced functional units in an aircraft cabin, in particular an emergency oxygen supply system for passengers of an aircraft, comprising the steps of:
  initializing a wireless network comprising a plurality of nodes, wherein each node is associated with a device, in particular a remotely operable device wherein said initializing comprises associating each node a sending time slot within a time frame using a TDMA synchronization scheme,
    wherein each node is active to send signals during its sending time slot and is active to receive signals during a first set of time slots comprising a number of time slots of said frame,
    wherein the sending time slot of a node is different from the sending time slots of at least a plurality of its neighbored nodes, wherein a neighbored node of a node is defined to be within a predetermined distance to said node, sending an activation signal from one of the nodes to at least the plurality of nodes in a predetermined neighborhood distance to said node, wherein each node after having received said activation signal transmits said activation signal during the sending time slot associated to said node to at least one neighbored node, and wherein a node of the network is associated to a control unit of a portable breathing equipment device and said control unit is adapted to send data comprising information about the oxygen content of an oxygen source within said device or maintenance cycles of said device or the location of said device via said node, to a control unit of a personal protective equipment device and said control unit is adapted to send data comprising information about the oxygen content of an oxygen source within said device or maintenance cycles of said device or the location of said device via said node, or to a seat occupation control unit and said control unit is adapted to send data comprising information about occupation of a single or a plurality of passenger seats of the aircraft via said node.

* * * * *